(12) United States Patent
Chen

(10) Patent No.: US 8,087,785 B2
(45) Date of Patent: Jan. 3, 2012

(54) PROJECTION DISPLAY APPARATUS

(75) Inventor: Sung-Nan Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 562 days.

(21) Appl. No.: 12/036,327

(22) Filed: Feb. 25, 2008

(65) Prior Publication Data

US 2009/0213333 A1 Aug. 27, 2009

(51) Int. Cl.
*G03B 21/14* (2006.01)
(52) U.S. Cl. .......................... 353/20; 353/38
(58) Field of Classification Search ............... 353/20, 353/30–31, 33–34, 37–38, 94, 122; 349/5, 349/7–9; 359/483, 483.01
See application file for complete search history.

(56) References Cited

U.S. PATENT DOCUMENTS

| | | | |
|---|---|---|---|
| 6,674,579 B2 * | 1/2004 | Brennesholtz | 359/634 |
| 6,869,185 B2 * | 3/2005 | Kaminsky et al. | 353/31 |
| 6,943,850 B2 | 9/2005 | Sato | |
| 7,023,602 B2 * | 4/2006 | Aastuen et al. | 359/247 |
| 2003/0223044 A1 * | 12/2003 | Janssen | 353/20 |
| 2004/0145703 A1 * | 7/2004 | O'Connor et al. | 353/20 |
| 2005/0226585 A1 * | 10/2005 | Abu-Ageel | 385/133 |
| 2006/0234784 A1 * | 10/2006 | Reinhorn | 455/575.1 |
| 2008/0062519 A1 * | 3/2008 | Facius | 359/483 |

* cited by examiner

*Primary Examiner* — Tony Ko
*Assistant Examiner* — Jori S Reilly-Diakun
(74) *Attorney, Agent, or Firm* — Thomas|Kayden

(57) ABSTRACT

A projection display apparatus includes a polarization beam splitter, a light source, a polarization changing device, an optical uniformizing element, a light valve module and a projection lens. The light source emits an illumination beam. The polarization beam splitter, the polarization changing device, the optical uniformizing element, and the light valve module are disposed in the optical path of the illumination beam. The polarization beam splitter transmits the illumination beam. The polarization changing device changes the polarization direction of the illumination beam and reflects the illumination beam back to the polarization beam splitter. The optical uniformizing element is between the polarization beam splitter and the polarization changing device for uniformizing the illumination beam. The light valve module converts the illumination beam reflected by the polarization changing device via the polarization beam splitter into an image beam. The projection lens is disposed in the optical path of the image beam.

14 Claims, 9 Drawing Sheets

PROJECTION DISPLAY APPARATUS

BACKGROUND OF THE INVENTION

1. Field of the Invention

The invention relates to a projection display apparatus.

2. Description of the Related Art

FIG. 1 is a schematic view of a conventional projection display apparatus disclosed in U.S. Pat. No. 6,943,850 'OPTICAL APPARATUS AND PROJECTION TYPE DISPLAY APPARATUS FOR REDUCING A PHYSICAL DISTANCE BETWEEN A LIGHT SOURCE AND A DISPLAY'. The conventional projection display apparatus 10 comprises a light source 11, a pair of lens arrays 12 and 13, a quarter wave plate 14, a mirror 15, two prisms 16 and 19, two lenses 17 and 18, a light valve module 20 and a projection lens 21. In the conventional projection display apparatus 10, an illumination beam emitted from the light source 11 passes through the lens arrays 12 and 13 and the lens 17, and then enters the prism 16. Next, the illumination beam passes through the prism 16, enters the quarter wave plate 14, and then is reflected by the mirror 15. Following, the illumination beam enters the prism 16 again and is perpendicularly reflected into the lens 18 and the prism 19. Next, the illumination beam is perpendicularly refracted into the light valve module 20 via the prism 19 and returns the prism 19. Finally, the illumination beam enters the projection lens 21. The conventional projection display apparatus 10 has a pair of lens arrays 12 and 13. Thus, distance between the lens arrays 12 and 13 increases the volume of the projector. Light and thin electronic devices bring convenience, thus, miniaturization of electronic devices is important for a manufacturer.

BRIEF SUMMARY OF THE INVENTION

An embodiment of the invention provides a projection display apparatus. The projection display apparatus includes a polarization beam splitter, a light source, a polarization changing device, an optical uniformizing element, a light valve module, and a projection lens. The light source is capable of emitting an illumination beam. The polarization beam splitter is disposed in the optical path of the illumination beam and transmits the illumination beam emitted from the light source. The polarization changing device is disposed in the optical path of the illumination beam for changing the polarization direction of the illumination beam from the polarization beam splitter and reflecting the illumination beam back to the polarization beam splitter. The optical uniformizing element is disposed in the optical path of the illumination beam and between the polarization beam splitter and the polarization changing device for uniformizing the illumination beam. The light valve module is disposed in the optical path of the illumination beam, and converts the illumination beam reflected by the polarization changing device via the polarization beam splitter into an image beam transmitting to the polarization beam splitter. The projection lens is disposed in the optical path of the image beam and projects the image beam from the polarization beam splitter into a frame.

Other objectives, features and advantages of the present invention will be further understood from the following more detailed technological features disclosed by the embodiments of the present invention, wherein the described and shown preferred embodiments of the invention are simply illustrations of modes best suited to carry out the invention.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In the following detailed description of the preferred embodiments, reference is made to the accompanying drawings which form a part hereof, and in which is shown by way of illustration of specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Additionally, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component faces "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
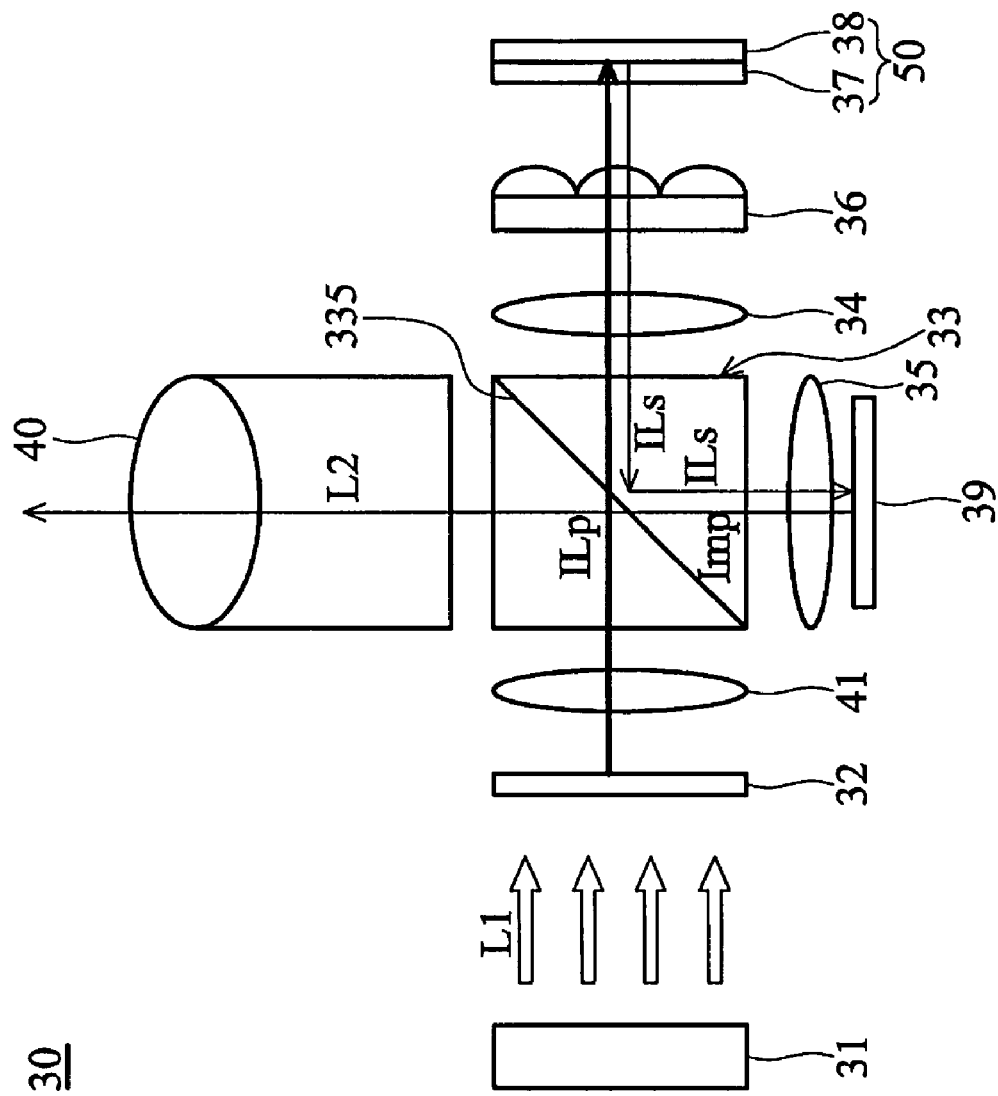
FIG. 2 is a schematic view of an embodiment of a projection display apparatus of the invention.
Figure 3:
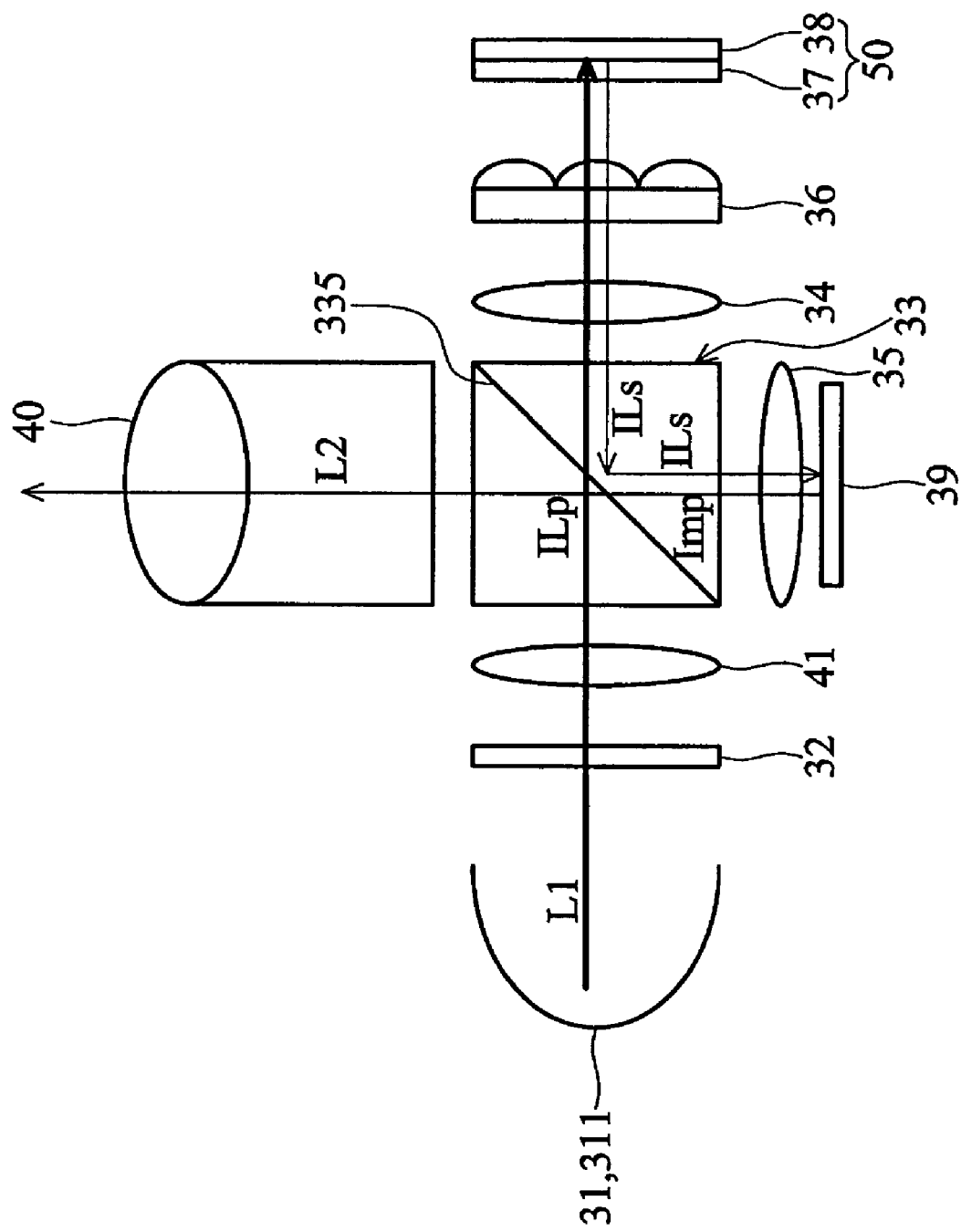
FIG. 3 is a schematic view of another embodiment of a projection display apparatus of the invention.

Referring to FIGS. 2 and 3, FIG. 2 is a schematic view of an embodiment of a projection display apparatus of the invention and FIG. 3 is a schematic view of another embodiment of a projection display apparatus of the invention. The projection display apparatus 30 includes a light source 31, a polarization beam splitter 33, an optical uniformizing element 36, a polarization changing device 50, a light valve module 39 and a projection lens 40. The light source 31 is capable of emitting an illumination beam L1. The polarization beam splitter 33 is disposed in the optical path of the illumination beam L1 and transmits the illumination beam L1 emitted from the light source 31. The polarization changing device 50 is disposed in the optical path of the illumination beam L1 for changing the polarization direction of the illumination beam L1 transmitted from the polarization beam splitter 33 and reflecting the illumination beam L1 back to the polarization beam splitter 33. The optical uniformizing element 36 is disposed in the optical path of the illumination beam L1 and between the polarization beam splitter 33 and the polarization changing device 50 for uniformizing the illumination beam L1. Specifically, the polarization changing device 50 includes a quarter wave plate 37 and a mirror 38. The quarter wave plate 37 is disposed at one side of the mirror 38 and between the mirror 38 and the optical uniformizing element 36. The polarization beam splitter 33 includes a prism having an inclined surface 335 disposed diagonally therein. Note that the optical uniformizing element 36 is a lens array in this embodiment. The light valve module 39 is disposed adjacent to the polarization beam splitter 33 and in the optical path of the illumination beam L1. The light valve module 39 converts the illumination beam L1 reflected by the polarization changing device 50 via the polarization beam splitter 33 into an image beam L2 transmitting to the polarization beam splitter 33. The projection lens 40 is disposed in the optical path of the image beam L2 and projects the image beam L2 from the polarization beam splitter 33 into a frame (not shown). Moreover, the projection display apparatus 30 further includes a P-S converter 32, a first lens 34, a second lens 35, and a third lens 41 which are disposed in the optical path of the illumination beam L1. The P-S converter 32 is disposed between the light source 31 and the polarization beam splitter 33. The first lens 34 is disposed between the polarization beam splitter 33 and the optical uniformizing element 36, the second lens 35 is disposed between the polarization beam splitter 33 and the light valve module 39, and the third lens 41 is disposed between the polarization beam splitter 33 and the P-S converter 32. In this embodiment, the light source 31 emits a non-polarized illumination beam L1. The light source 31 may be an ultra-high pressure lamp 311 (shown in FIG. 3) or a light emitting diode.

Figure 1:
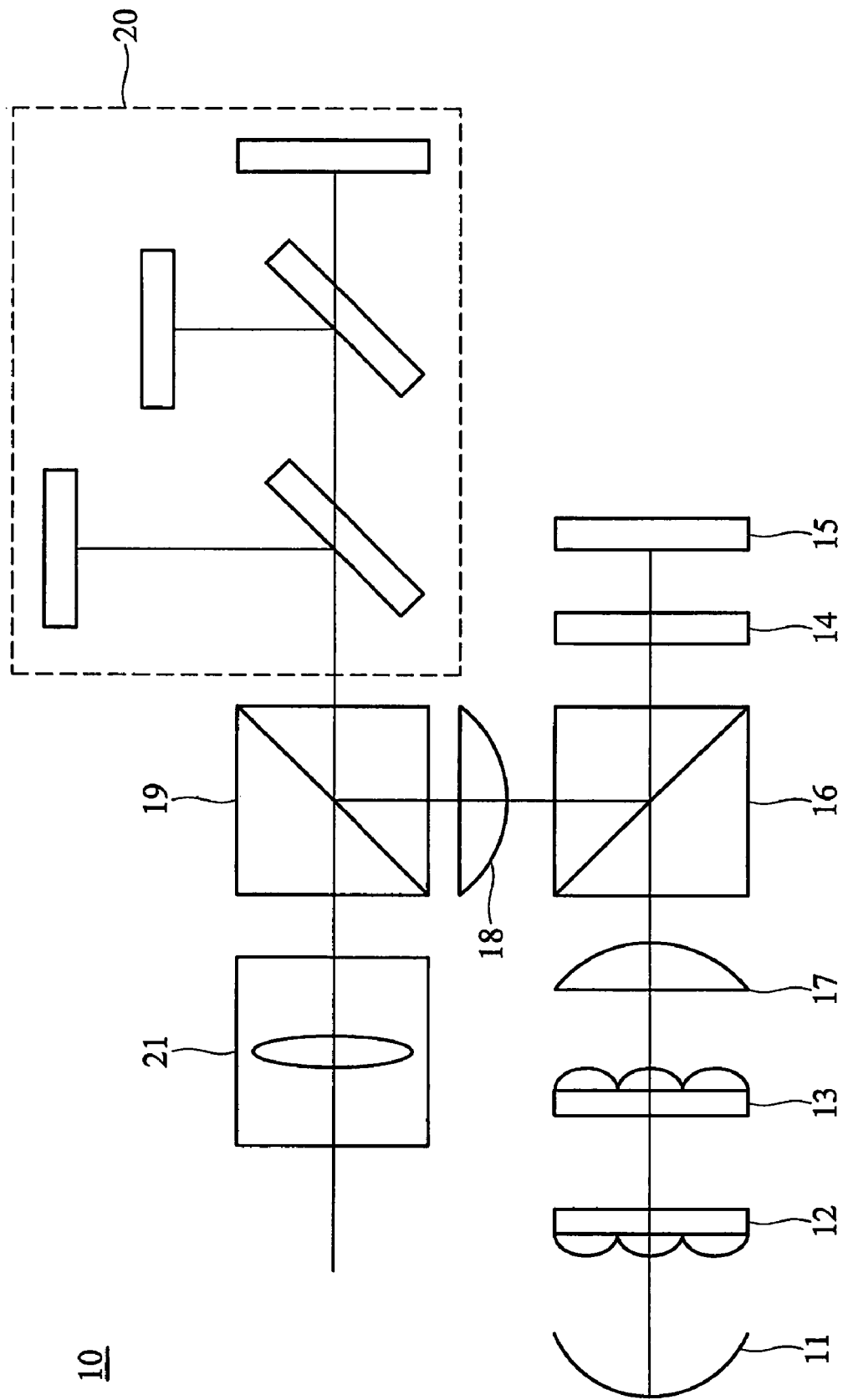
FIG. 1 is a schematic view of a conventional projection display apparatus.

The non-polarized illumination beam L1 emitted from the light source 31 passes through the P-S converter 32 for transformation into the polarized illumination beam L1 with a first polarization direction. In this embodiment, the polarized illumination beam L1 with the first polarization direction is a p-polarized illumination beam. The polarized illumination beam L1 with the first polarization direction passes through the third lens 41 and then enters the polarization beam splitter 33. In this embodiment, the polarization beam splitter 33 is a prism 33. The prism 33 includes an inclined surface 335 disposed diagonally in the prism 33. After leaving the polarization beam splitter 33, the polarized illumination beam L1 with the first polarization direction passes through the first lens 34, the optical uniformizing element 36, the quarter wave plate 37 and the mirror 38 in sequence. Then, the polarized illumination beam L1 with the first polarization direction is reflected and transformed into the polarized illumination beam L1 with a second polarization direction (s-polarized illumination beam) via the mirror 38. Next, the polarized illumination beam L1 with the second polarization direction enters the optical uniformizing element 36 and the polarization beam splitter 33 again. Following, the polarized illumination beam L1 with the second polarization direction is reflected by the inclined surface 335 of the polarization beam splitter 33 to pass through the second lens 35. Then, the polarized illumination beam L1 with the second polarization direction is reflected and transformed into the image beam L2 with the first polarization direction by the light valve module 39. Next, the image beam L2 with the first polarization direction enters the polarization beam splitter 33 again and passes through the projection lens 40 to be projected into a frame. The projection display apparatus 30 utilizes the mirror 38 to direct the illumination beam L1 to pass through the optical uniformizing element 36 twice. Thus, the amount of the lens array of the projection display apparatus 30 is less than that of the conventional projection display apparatus 10 in FIG. 1. Therefore, the structure according to the embodiments of the invention not only decreases length of the projection display apparatus 30 but also cost.

Figure 4:
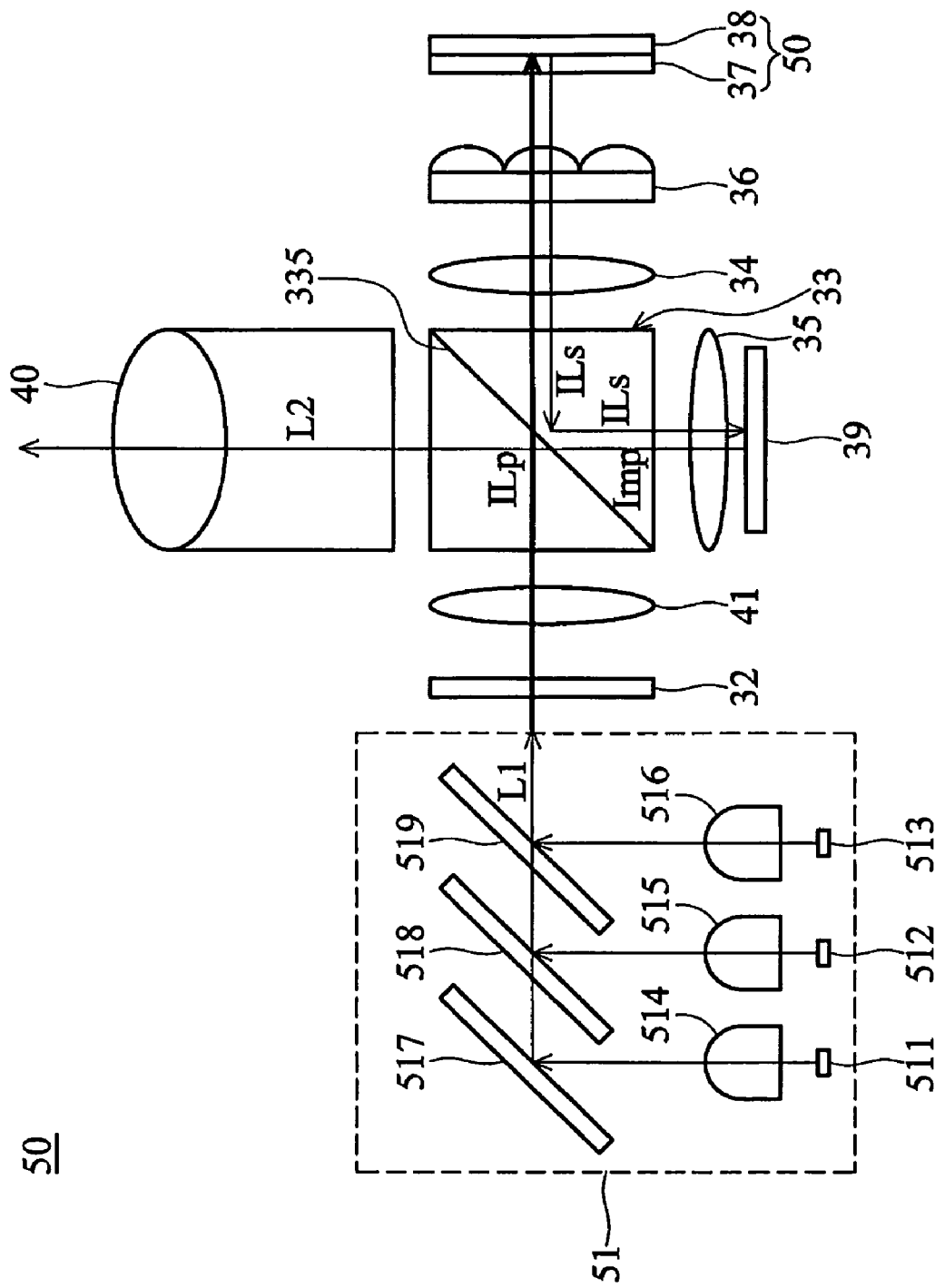
FIG. 4 is a schematic view of another embodiment of a projection display apparatus of the invention.

Referring to FIG. 4, FIG. 4 is a schematic view of another embodiment of a projection display apparatus of the invention. The projection display apparatus 50 of this embodiment is similar to that in FIG. 2. Thus, similarities are omitted for brevity. The difference between FIGS. 2 and 4 is the light source 51. The light source 51 of FIG. 4 includes a blue light emitting diode 511, a green light emitting diode 512, a red light emitting diode 513, three collimators 514, 515 and 516 and three dichroic mirrors 517, 518 and 519. The blue light emitting diode 511, the green light emitting diode 512 and the red light emitting diode 513 respectively emit three light source beams to the collimators 514, 515 and 516. The dichroic mirrors 517, 518 and 519 respectively receive the light source beams from the collimators 514, 515 and 516 to form the illumination beam L1.

Figure 5:
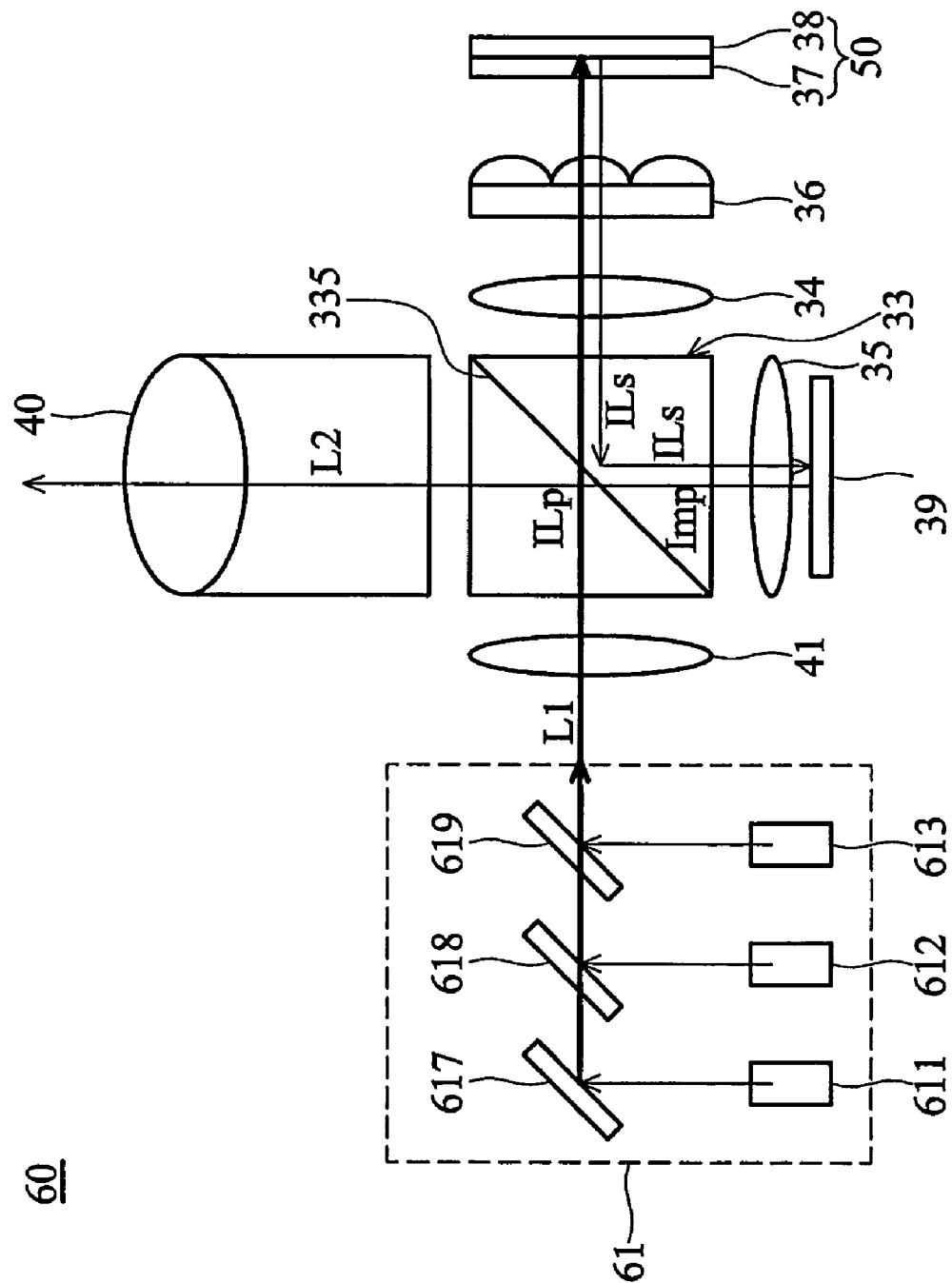
FIG. 5 is a schematic view of another embodiment of a projection display apparatus of the invention.

Referring to FIG. 5, FIG. 5 is a schematic view of another embodiment of a projection display apparatus of the invention. The projection display apparatus 60 of this embodiment is similar to that in FIG. 2. Thus, similarities are omitted for brevity. The difference between FIGS. 2 and 5 is the light source 61. The light source 61 may be a laser. In the embodiment, the light source 61 includes a blue laser 611, a green laser 612, a red laser 613, and three dichroic mirrors 617, 618 and 619. The blue laser 611, the green laser 612 and the red laser 613 respectively emit three light source beams to the dichroic mirrors 617, 618 and 619 to form the illumination beam L1. Then the illumination beam L1 enters the third lens 41. Note that the blue laser 611, the green laser 612, the red laser 613 may provide polarized light source beams. Thus, there is no P-S converter in this embodiment.

Figure 6:
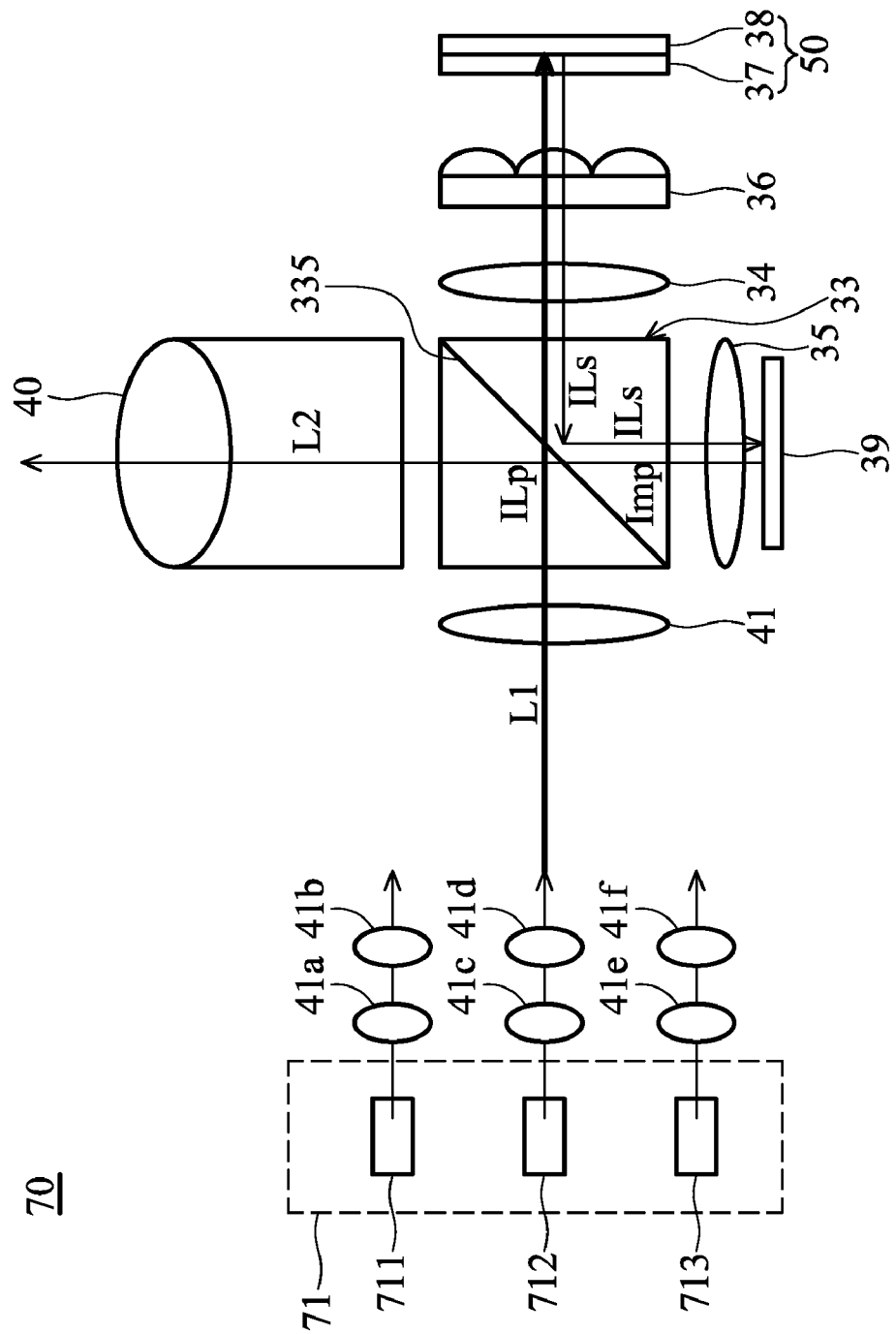
FIG. 6 is a schematic view of another embodiment of a projection display apparatus of the invention.

FIG. 6 is a schematic view of another embodiment of a projection display apparatus of the invention. The projection display apparatus 70 of this embodiment is similar to that in FIG. 5. Similarly, the light source 71 includes a blue laser 711, a green laser 712, and a red laser 713, thus, there is no P-S converter in this embodiment. Differently, note that the projection display apparatus 70 includes six lenses 41a, 41b, 41c, 41d, 41e and 41f and the light source beam from the blue laser 711 directly enters the lenses 41a and 41b, the light source beam from the green laser 712 directly enters the lenses 41c and 41d, and the light source beam from the red laser 713 directly enters the lenses 41e and 41f.

Figure 7:
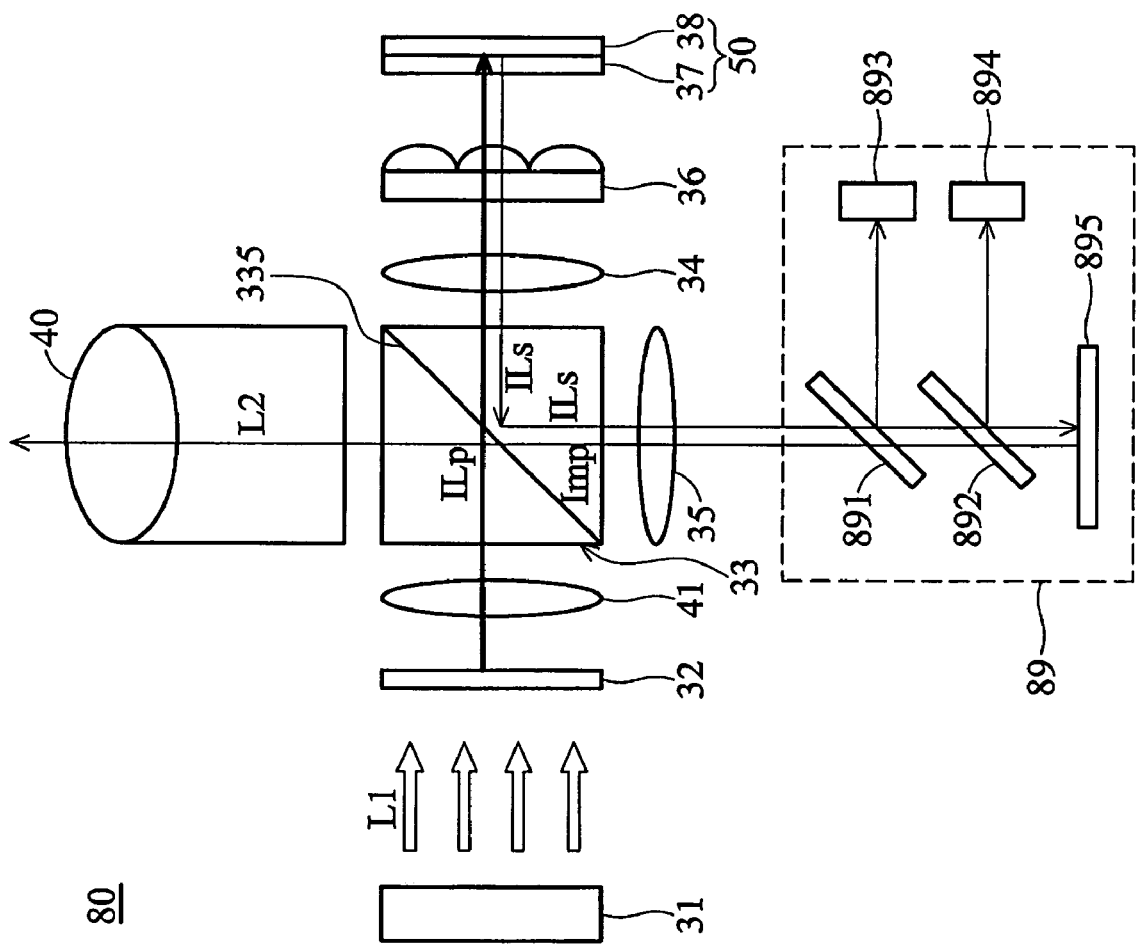
FIG. 7 is a schematic view of another embodiment of a projection display apparatus of the invention.

FIG. 7 is a schematic view of another embodiment of a projection display apparatus of the invention. The projection display apparatus 80 of this embodiment is similar to that in FIG. 2. Thus, similarities are omitted for brevity. The difference between FIGS. 2 and 7 is a light valve module 89. The light valve module 89 includes two dichroic mirrors 891 and 892, and three light valves 893, 894 and 895. After the illumination beam L1 passes through the second lens 35, the illumination beam L1 is divided into a red illumination beam, a green illumination beam, and a blue illumination beam by the two dichroic mirrors 891 and 892 to respectively reach the light valves 893, 894 and 895.

Figure 8:
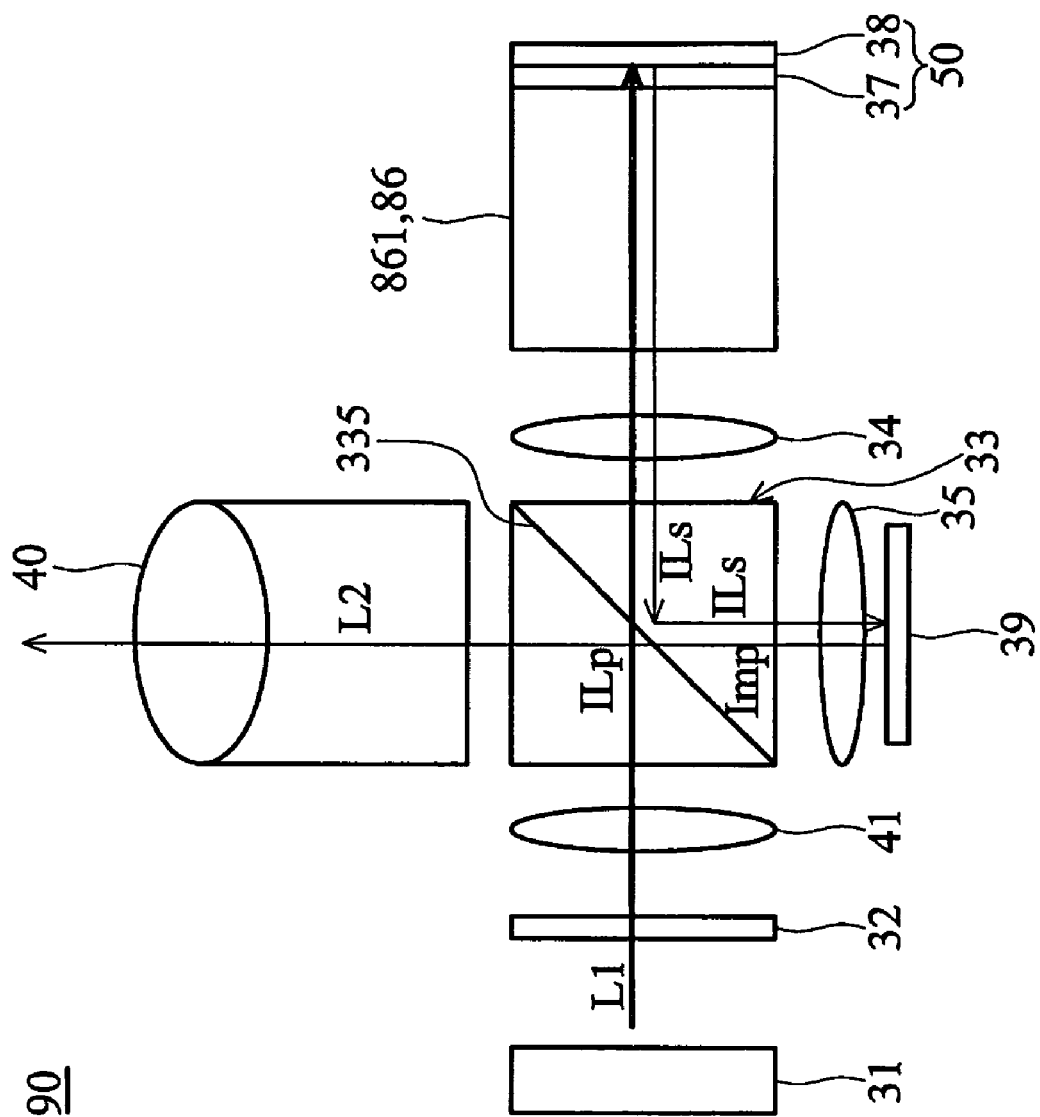
FIG. 8 is a schematic view of another embodiment of a projection display apparatus of the invention.

Referring to FIG. 8, FIG. 8 is a schematic view of another embodiment of a projection display apparatus of the invention. The projection display apparatus 90 of this embodiment is similar to that in FIG. 2. Thus, similarities are omitted for brevity. The difference between FIGS. 2 and 8 is an optical uniformizing element 86. In this embodiment, the optical uniformizing element 86 is a rod 861. The rod 861 is tightly connected to the quarter wave plate 37. After the illumination beam L1 passes through the first lens 34, the illumination beam L1 enters the rod 861 and then is reflected via the mirror 38. Thus, the illumination beam L1 enters the rod 861 twice. Length of the rod 861 is half that of a conventional projection display apparatus without a mirror. Therefore, the structure according to the embodiments of the invention not only decreases length of the projection display apparatus 90 but also cost.

Figure 9:
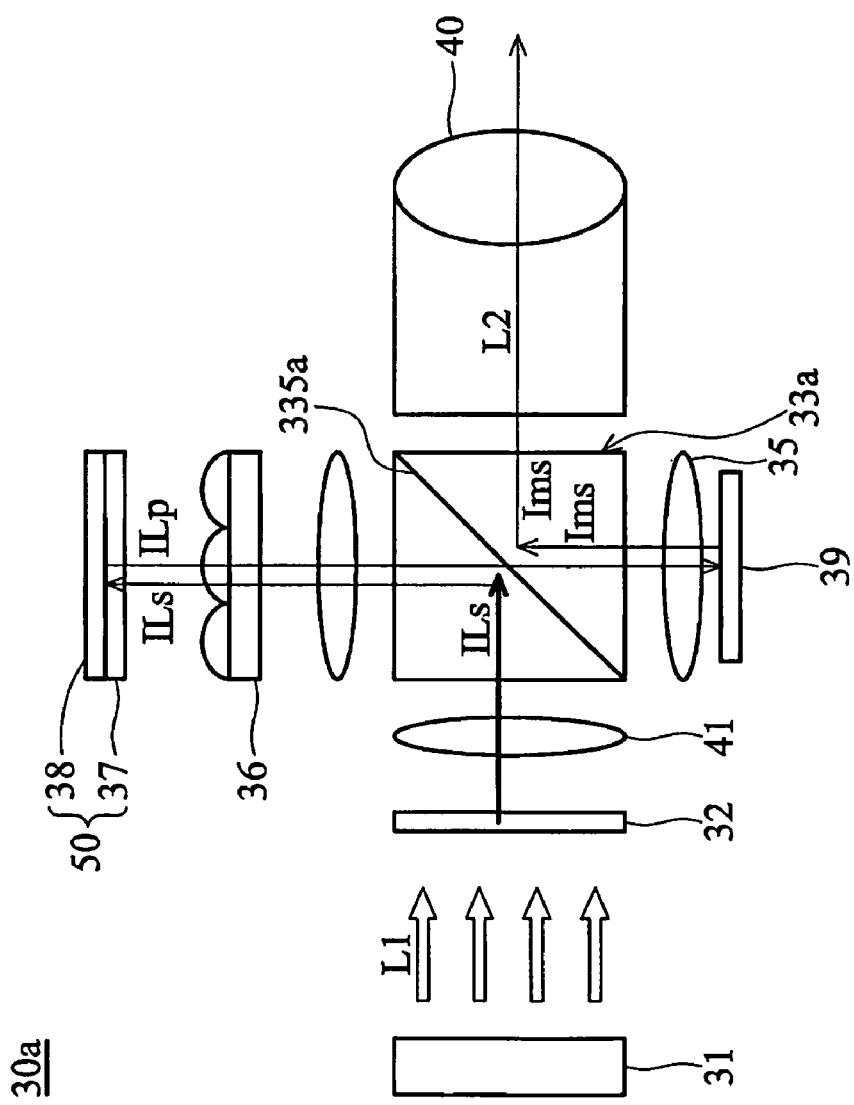
FIG. 9 is a schematic view of another embodiment of a projection display apparatus of the invention.

Referring to FIG. 9, FIG. 9 is a schematic view of another embodiment of a projection display apparatus of the invention. The projection display apparatus 30a of this embodiment is similar to that in FIG. 2. Thus, similarities are omitted for brevity. The difference between FIGS. 2 and 8 is the polarized property of the polarization beam splitter 33a. The non-polarized illumination beam L1 emitted from the light source 31 passes through the P-S converter 32 for transformation into the polarized illumination beam L1 with a first polarization direction. In this embodiment, the polarized illumination beam L1 with the first polarization direction is a s-polarized illumination beam. The polarized illumination beam L1 with the first polarization direction passes through the third lens 41 and then enters the polarization beam splitter 33a. The polarized illumination beam L1 with the first polarization direction is reflected by the inclined surface 335a of the polarization beam splitter 33a to pass through the first lens 34, the optical uniformizing element 36, the quarter wave plate 37 and the mirror 38 in sequence. Then, the polarized illumination beam L1 with the first polarization direction is reflected and transformed into the polarized illumination beam L1 with a second polarization direction (p-polarized illumination beam) via the mirror 38. Next, the polarized illumination beam L1 with the second polarization direction enters the optical uniformizing element 36 and the polarization beam splitter 33 again. Following, the polarized illumination beam L1 with the second polarization direction passes through the polarization beam splitter 33a and the second lens 35 in sequence. Then, the polarized illumination beam L1 with the second polarization direction is reflected and transformed into the image beam L2 with the first polarization direction by the light valve module 39. Next, the image beam L2 with the first polarization direction enters the polarization beam splitter 33a again and is reflected by the polarization beam splitter 33a and passes through the projection lens 40 to be projected into the frame.

Figure 10:
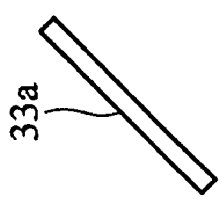
FIG. 10 is a schematic view of an embodiment of a polarization beam splitter of the invention.

Referring to FIG. 10, FIG. 10 is a schematic view of an embodiment of a polarization beam splitter of the invention. In this embodiment, the polarization beam splitter 33a is a wire-type. The wire-type may be used in above-mentioned embodiments. Simultaneously referring to FIG. 2, if the wire-type is used, the prism of the wire-type is installed obliquely at 45 degrees corresponding to the optical path of the illumination beam L1.

The descriptions of the preferred embodiments of the invention have been presented for purposes of illustration and description. It is not intended to be exhaustive or to limit the invention to a precise form or to an exemplary embodiment disclosed. Accordingly, the foregoing description should be regarded as illustrative rather than restrictive. Obviously, many modifications and variations will be apparent to practitioners with ordinary skill in the art. The embodiments are chosen and described in order to best explain the principles of the invention and its best mode practical application, thereby to enable those with ordinary skill in the art to understand the invention. For example, various embodiments, with various modifications of the invention may be suited for particular use or implementation which is contemplated. It is intended that the scope of the invention be defined by the claims appended hereto and their equivalents in which all terms are meant in their broadest reasonable sense unless otherwise indicated. Therefore, the term "the invention", "the present invention" or the like does not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection display apparatus, comprising:
    at least one light source, capable of emitting an illumination beam;
    a polarization beam splitter, disposed in the optical path of the illumination beam and transmitting the illumination beam emitted from the light source;
    a polarization changing device, disposed in the optical path of the illumination beam for changing the polarization direction of the illumination beam transmitted from the polarization beam splitter and reflecting the illumination beam back to the polarization beam splitter;
    an optical uniformizing element, disposed in the optical path of the illumination beam and between the polarization beam splitter and the polarization changing device for uniformizing the illumination beam, wherein the illumination beam sequentially passes through the polarization beam splitter and the optical uniformizing element and is reflected by the polarization changing device, and the illumination beam reflected by the polarization changing device again passes through the optical uniformizing element to reach the polarization beam splitter, such that the optical uniformizing element uniformizes the illumination beam twice;
    a light valve module, disposed in the optical path of the illumination beam, and converting the illumination beam reflected by the polarization changing device via the polarization beam splitter into an image beam transmitting to the polarization beam splitter; and a projection lens, disposed in the optical path of the image beam and projecting the image beam from the polarization beam splitter into a frame.

2. The projection display apparatus as claimed in claim 1, wherein the polarization changing device comprises a quarter wave plate and a mirror, and the quarter wave plate is disposed between the mirror and the optical uniformizing element.

3. The projection display apparatus as claimed in claim 1, further comprising a first, a second, and a third lens, wherein the first lens is disposed between the polarization beam splitter and the optical uniformizing element, the second lens is disposed between the polarization beam splitter and the light valve module, and the third lens is disposed between the polarization beam splitter and the light source.

4. The projection display apparatus as claimed in claim 1, wherein the polarization beam splitter comprises a prism, and the prism comprises an inclined surface disposed diagonally in the prism.

5. The projection display apparatus as claimed in claim 1, wherein the polarization beam splitter comprises a wire-type installed obliquely at 45 degrees relative to the optical path of the illumination beam.

6. The projection display apparatus as claimed in claim 1, wherein the light valve module comprises three light valves and two dichroic mirrors, the illumination beam emitted from the light source passes through the dichroic mirrors to be divided into a red illumination beam, a green illumination beam and a blue illumination beam, and the red illumination beam, the green illumination beam and the blue illumination beam respectively reach the light valves.

7. The projection display apparatus as claimed in claim 1, further comprising a P-S converter between the light source and the polarization beam splitter, wherein the light source comprises an ultra-high pressure lamp, the ultra-high pressure lamp emits a non-polarized illumination beam, and the non-polarized illumination beam is transformed into a polarized illumination beam via the P-S converter.

8. The projection display apparatus as claimed in claim 1, wherein the light source comprises at least a laser.

9. The projection display apparatus as claimed in claim 8, wherein the at least a laser comprises a blue laser, a green laser, a red laser, the light source further comprises three dichroic mirrors, and the blue laser, the green laser and red laser respectively emit three light source beams to the dichroic mirrors.

10. The projection display apparatus as claimed in claim 1, further comprising a P-S converter between the light source and the polarization beam splitter, wherein the light source comprises at least a light emitting diode, the light emitting diode emits a non-polarized illumination beam, and the non-polarized illumination beam is transformed into a polarized illumination beam via the P-S converter.

11. The projection display apparatus as claimed in claim 10, wherein the at least a light emitting diode comprises a blue light emitting diode, a green light emitting diode, a red light emitting diode, the light source further comprises three collimators and three dichroic mirrors, the blue light emitting diode, the green light emitting diode and the red light emitting diode respectively emit three light source beams to the collimators, and the dichroic mirrors respectively receive the light source beams from the collimators to form the illumination beam.

12. The projection display apparatus as claimed in claim 1, wherein the optical uniformizing element comprises a lens array or a rod.

13. The projection display apparatus as claimed in claim 1, wherein the illumination beam with a first polarization direction passes through the polarization beam splitter and the optical uniformizing element in sequence and then enters the polarization changing device, the illumination beam with the first polarization direction is reflected and transformed into the illumination beam with a second polarization direction by the polarization changing device, the illumination beam with the second polarization direction goes back to the polarization beam splitter and is reflected by the polarization beam splitter to the light valve module to be reflected and transformed into the image beam with the first polarization direction by light valve module, and the image beam with the first polarization direction passes through the polarization beam splitter and the projection lens to be projected into the frame.

14. The projection display apparatus as claimed in claim 1, wherein the illumination beam with a first polarization direction is reflected by the polarization beam splitter, passes through the optical uniformizing element and then is reflected and transformed into the illumination beam with a second polarization direction by the polarization changing device, the illumination beam with the second polarization direction goes back to the polarization beam splitter and passes the polarization beam splitter to the light valve module, the illumination beam with the second polarization direction is reflected by the light valve module to be transformed into the image beam with the first polarization direction, and the image beam with the first polarization direction is reflected by the polarization beam splitter and passes through the projection lens to be projected into the frame.

* * * * *